United States Patent
Lee et al.

(10) Patent No.: US 11,125,584 B2
(45) Date of Patent: **\*Sep. 21, 2021**

(54) END OF SHAFT INDUCTIVE ANGULAR POSITION SENSOR WITH A METAL-FERRITE COMPLEMENTARY COUPLER

(71) Applicant: KSR IP Holdings, LLC, Wilmington, DE (US)

(72) Inventors: Joong K. Lee, Chatham (CA); Lingmin Shao, London (CA); Ryan W. Elliott, Thamesville (CA)

(73) Assignee: KSR IP Holdings, LLC, Wilmington, DE (US)

( * ) Notice: Subject to any disclaimer, the term of this patent is extended or adjusted under 35 U.S.C. 154(b) by 132 days.

This patent is subject to a terminal disclaimer.

(21) Appl. No.: 16/549,446

(22) Filed: Aug. 23, 2019

(65) Prior Publication Data

US 2020/0064158 A1    Feb. 27, 2020

Related U.S. Application Data

(60) Provisional application No. 62/722,404, filed on Aug. 24, 2018.

(51) Int. Cl.
*G01D 5/20* (2006.01)
*H01F 38/14* (2006.01)

(52) U.S. Cl.
CPC ........... *G01D 5/2046* (2013.01); *H01F 38/14* (2013.01)

(58) Field of Classification Search
CPC .. G01D 5/2046; G01D 18/00; G01D 5/34746; G01D 2205/90; G01D 5/245;
(Continued)

(56) References Cited

U.S. PATENT DOCUMENTS 5,323,109 A  *  6/1994  Mehnert .............. G01D 5/2046
                                                 324/207.17
7,191,759 B2     3/2007  Lee
(Continued)

FOREIGN PATENT DOCUMENTS

EP    1083408 A2    3/2001
EP    1078226 B1    10/2003
(Continued)

OTHER PUBLICATIONS

International Search Report dated Dec. 11, 2019; International Application No. PCT/US2019/047908; filing dated Aug. 23, 2019.

*Primary Examiner* — Melissa J Koval
*Assistant Examiner* — Trung Q Nguyen
(74) *Attorney, Agent, or Firm* — Dinsmore & Shohl LLP

(57) ABSTRACT

In accordance with one embodiment of the present disclosure, an inductive sensor assembly is provided. The inductive sensor assembly includes a sensor assembly and a shaft. The sensor assembly include a transmitter coil and a two-part receiver coil. The shaft includes a first end. The first end includes a first planar surface and a second planar surface. The second planer surface extends from the first planar surface. A target is formed from the first planar surface and the second planar surface. When the target is moved about a shaft axis, the first planar and second planar surfaces modify an inductive coupling between the transmitter coil and the two-part receiver coil.

16 Claims, 7 Drawing Sheets

(58) Field of Classification Search
CPC ........... G01D 5/347; H01F 38/14; H04L 7/00;
G01R 35/00; G01K 15/00; G01J 1/44;
G04B 27/02; G04C 3/007; G04C 3/004
USPC ........ 324/200, 207.2–207.23, 205, 210, 219,
324/228, 244, 252, 262, 500, 750.12,
324/750.21, 754.17, 754.29
See application file for complete search history.

(56) References Cited

U.S. PATENT DOCUMENTS

| | | |
|---|---|---|
| 7,276,897 B2 | 10/2007 | Lee |
| 7,538,544 B2 | 5/2009 | Lee |
| 7,906,960 B2 | 3/2011 | Lee |
| 7,911,354 B2 | 3/2011 | Kim |
| 8,098,061 B2 | 1/2012 | Elliott et al. |
| 8,508,242 B2 | 8/2013 | Shao et al. |
| 9,983,045 B2 | 5/2018 | O'Neill |
| 10,278,288 B2 | 4/2019 | Elliott et al. |
| 10,320,499 B2 | 6/2019 | Lomnitz |
| 2003/0020642 A1 | 1/2003 | Ely et al. |
| 2005/0225320 A1 | 10/2005 | Lee |
| 2016/0131503 A1 | 5/2016 | Goto et al. |
| 2017/0248445 A1 | 8/2017 | Ausserlechner |
| 2018/0102213 A1* | 4/2018 | Hanabusa ............... H01F 5/003 |

FOREIGN PATENT DOCUMENTS

| | | |
|---|---|---|
| EP | 1738140 B1 | 4/2016 |
| JP | 2012018086 A | 1/2012 |
| KR | 1020130061285 A | 6/2013 |

\* cited by examiner

END OF SHAFT INDUCTIVE ANGULAR POSITION SENSOR WITH A METAL-FERRITE COMPLEMENTARY COUPLER

CROSS REFERENCE TO RELATED APPLICATIONS

This utility patent application claims priority from U.S. Provisional Patent Application Ser. No. 62/722,404, filed on Aug. 24, 2018, the entire contents of which is incorporated herein in its entirety.

TECHNICAL FIELD

The present specification generally relates to inductive angular position sensors and, more particularly, to end-of-shaft coupler elements.

BACKGROUND

It is known to provide, in automotive applications, inductive angular position sensors printed on a printed circuit board ("PCB"). An inductive position sensor includes a transmitter coil powered by an alternating current source to produce an electromagnetic carrier flux. A receiver coil receives the carrier flux, and generates a receiver signal. The receiver signal varies with the position of a coupler element (such as a rotor) supported parallel to and closely adjacent to the transmitter coil and receiver coil.

The coupler element moves with the part whose position is to be measured. As such, a one-pole inductive sensor can measure up to 360 degrees angle while a multipole can only measure 360/n degrees where n is equal to the number of poles. However, the one-pole inductive sensor does not have a compensation mechanism such as found on the multipole sensor. As such, the one-pole sensor is vulnerable to a concentricity error, or an error because of the misalignment of the coupler axis, which introduces significant sensor output errors. Therefore, there is a tight concentricity tolerance of the coupler in one-pole angular sensor applications.

As such, there is a need for a relaxed concentricity tolerance of the coupler in one-pole angular sensor applications.

SUMMARY

In one embodiment, an inductive sensor assembly is provided. The inductive sensor assembly includes a sensor assembly and a shaft. The sensor assembly includes a transmitter coil and a two-part receiver coil. The shaft includes a first end. The first end includes a first planar surface and a second planar surface. The second planer surface extends from the first planar surface. A target is formed from the first planar surface and the second planar surface. When the target is moved about a shaft axis, the first planar and second planar surfaces modify an inductive coupling between the transmitter coil and the two-part receiver coil.

In another embodiment, a one-pole inductive sensor assembly is provided. The one-pole inductive sensor assembly includes a sensor assembly and a shaft. The sensor assembly include a transmitter coil and a two-part receiver coil. The shaft includes a first end. The first end includes a target. The target includes a first planar surface formed from a metallic material and a second planar surface formed from a layer of magnetic material. The second planar surface extends from the first planar surface. When the target is moved about a shaft axis, the first planar and second planar surfaces modify an inductive coupling between the transmitter coil and the two-part receiver coil such there is a symmetry of a multi-pole inductive sensor assembly.

These and additional features provided by the embodiments described herein will be more fully understood in view of the following detailed description, in conjunction with the drawings.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION

Figure 1A:
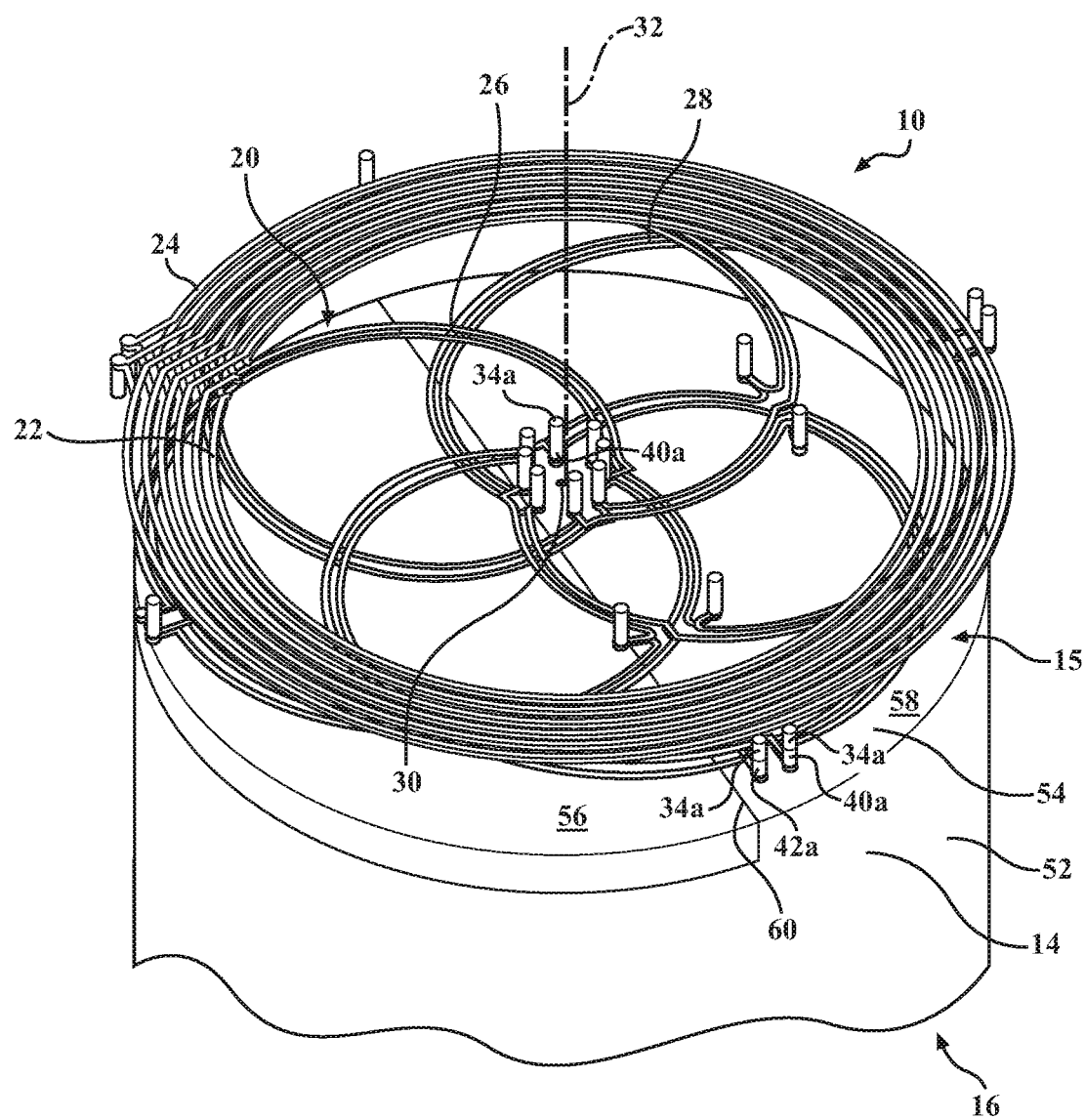
FIG. 1A schematically depicts a perspective view of an one pole sensor assembly according to one or more embodiments shown and described herein.

Embodiments described herein are directed to a one-pole inductive position sensor assembly. The assembly includes a transmitter coil, a two-part receiver coil, and an end of a shaft. The transmitter coil is circular having an outer diameter. The two-part receiver coil is positioned between at least two layers of a printed circuit board and extends radially from a center axis terminating within the outer diameter of the transmitter coil. The end of the shaft is a target configured to move about the center axis of the two-part receiver coil. The target includes a first planar surface and a second planer surface that extends from the first planar surface. The first planar surface is a metallic material configured to form an eddy plate. The second planar surface is a layer of magnetic material. In some embodiments, the layer of magnetic material is a soft magnetic material, such as ferrite. When the target is moved about the center axis, the first planar and second planar surfaces modify an inductive coupling between the transmitter coil and the two-part receiver coil such there is a symmetry of a multi-pole inductive sensor assembly in the one pole sensor arrangement.

Now referring to FIGS. 1A-1F, a sensor assembly 10 is schematically depicted. The sensor assembly 10 is a one-pole and includes a sensor 12 and a first end 14 of a shaft 16. It should be appreciated that only a portion of the shaft 16 is illustrated and that the shaft may be any width, diameter, radius, and/or the like. The sensor 12 includes a transmitter coil 18, a two-part receiver coil 20, and, in some embodiments, a printed circuit board (PCB) 35. The transmitter coil 18 may be one or more loops in a conventional circular coil design, or other configurations can be used. The transmitter coil 18 has a predetermined inner diameter 22 and a predetermined outer diameter 24. The transmitter coil 18, which may also be referred to as an exciter coil, may be powered by an alternating current source. When excited by electrical energy, the transmitter coil 18 radiates electromagnetic radiation. There is inductive coupling between the transmitter coil 18 and any other proximate coils, which induces a signal in that coil. Inductive coupling between the transmitter coil 18 and the two-part receiver coil 20 generates a receiver signal in the receiver coil.

The two-part receiver coil 20 includes a first receiver coil 26, a second receiver coil 28, and a center region 30. The center region 30 further includes a central axis 32. The first receiver coil 26 may include a plurality of c-shaped coils or crescent shaped coils 26a and the second receiver coil 28 may include a plurality of c-shaped coils or crescent shaped coils 28a. In some embodiments, each of the plurality of crescent shaped coils 26a and each of the plurality of crescent shaped coils 28a are a pair of coils, traces, and the like. In other embodiments, each of the plurality of crescent shaped coils 26a and each of the plurality of crescent shaped coils 28a are singular or have more than two coils, traces, and the like. The plurality of crescent shaped coils 26a of the first receiver coil 26 may be on a different layer of the PCB 35 than the plurality of crescent shaped coils 28a of the second receiver coil 28 in an axial direction or vertical direction (i.e., in the +/−Z-direction), as described in further detail herein. In some embodiments, the crescent shaped coils 26a and the crescent shaped coils 28a are a constant radius. In other embodiments, the crescent shaped coils 26a and the crescent shaped coils 28a are mostly a constant radius. In yet other embodiments, the crescent shaped coils 26a and the crescent shaped coils 28a have constant radius portions.

The plurality of crescent shaped coils 26a of the first receiver coil 26 extend at least partially radially outwardly from the center region 30 and, in embodiments, extend about the central axis 32. Connection junctions 34a may be disposed at each first end 36 and/or at a second end 38 of the plurality of crescent shaped coils 26a of the first receiver coil 26. In some embodiments, each of the connection junctions 34a of the first end 36 may be L-shaped such that the connection junctions define a circumference of the center region. It should be appreciated that the number of connection junctions 34a may depend on the number of coils, and, as such, embodiments described herein are non-limiting examples thereof.

In some embodiments, each of the connection junctions 34a of the second end 38 may be L-shaped such that the connection junctions define an outer region. The circumference of the outer region may be adjacent to the outer diameter 24 of the transmitter coil 18. In embodiments, each of the connection junctions 34a of the first end 36 may be arranged such that the connection junctions 34a may be positioned towards the center region 30 while the connection junctions 34a of the second end 38 may be positioned in a direction away from the center region 30. In some embodiments, the plurality of crescent shaped coils 26a of the first receiver coil 26 further include additional or supplemental connection junctions 34b between the first end 36 and the second end 38. In some embodiments, the additional or supplemental connection junctions 34b may be along a radius of at least one of the plurality of crescent shaped coils 26a. The connection junctions 34b may be disposed at a point of a curved portion 40. The curved portion 40 may hook or bend towards and/or away from the center region 30. In embodiments, the plurality of crescent shaped coils 26a of the first receiver coil 26 are symmetric in shape. In other embodiments, the plurality of crescent shaped coils 26a of the first receiver coil 26 are not symmetric.

The plurality of crescent shaped coils 28a of the second receiver coil 28 extend at least partially radially outwardly from the center region 30 and, in some embodiments, about the central axis 32. Connection junctions 40a may be disposed at each first end 44 and connection junctions 42a at a second end 46 of the plurality of crescent shaped coils 28b of the second receiver coil 28. In some embodiments, each of the connection junctions 40a of the first end 44 may be L-shaped. It should be appreciated that the number of connection junctions 40a may depend on the number of coils, and, as such, embodiments described herein are non-limiting examples thereof.

It should be appreciated that the connection junctions 34a disposed at each first end 36 of the plurality of crescent shaped coils 26a of the first receiver coil 26 and connection junctions 40a disposed at each first end 44 plurality of crescent shaped coils 28a of the second receiver coil 28 align in an axial direction or in the vertical direction (i.e., in the +/−Z-direction) so to communicatively couple to one another. In embodiments, the coupling of the connection junctions 34a and the connection junctions 40a define a circumference of the center region 30.

In some embodiments, each of the connection junctions 42a of the second end 46 may be L-shaped such that the connection junctions define an outer region. The circumference of the outer region may be adjacent to the outer diameter 24 of the transmitter coil 18. In embodiments, each of the connection junctions 40a of the first end 44 and the connection junctions 42s of the second end 46 may be arranged such that the connection junctions 40a are positioned towards the center region 30. In some embodiments, the plurality of crescent shaped coils 28b of the second receiver coil 28 further include additional or supplemental connection junctions 42b between the first end 44 and the second end 46. In some embodiments, the additional or supplemental connection junctions 42b may be along a radius of at least one of the plurality of crescent shaped coils 28a. The connection junctions 42b may be disposed at a point of a curved portion 48. The curved portion 48 may bend towards and/or away from the center region 30. In embodiments, the plurality of crescent shaped coils 28a of the second receiver coil 28 are symmetric in shape. In other embodiments, the plurality of crescent shaped coils 28a of the second receiver coil 28 are not symmetric.

Figure 1B:
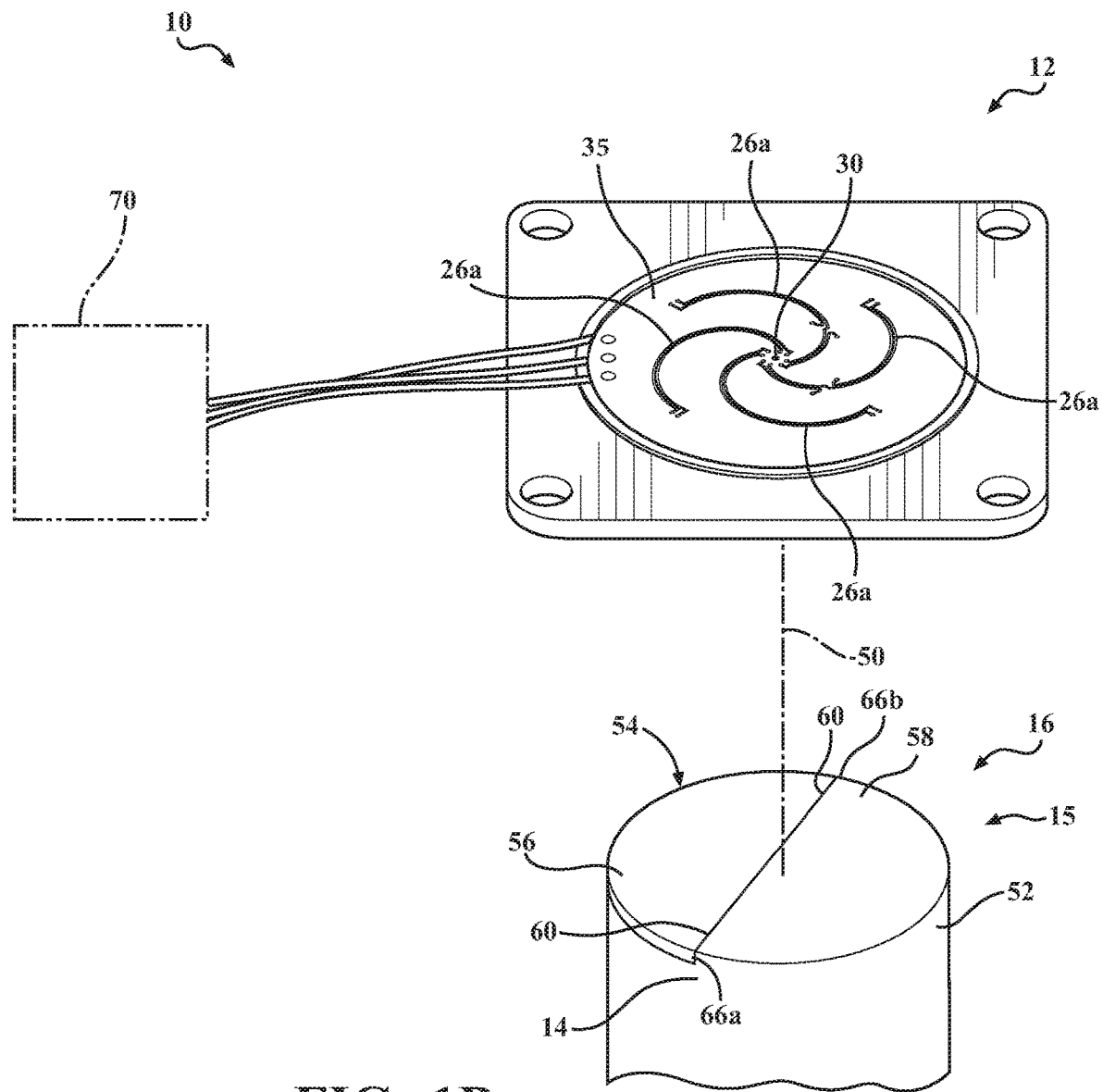
FIG. 1B schematically depicts an exploded view of the sensor assembly of FIG. 1A in an environment according to one or more embodiments shown and described herein.
Figure 1C:
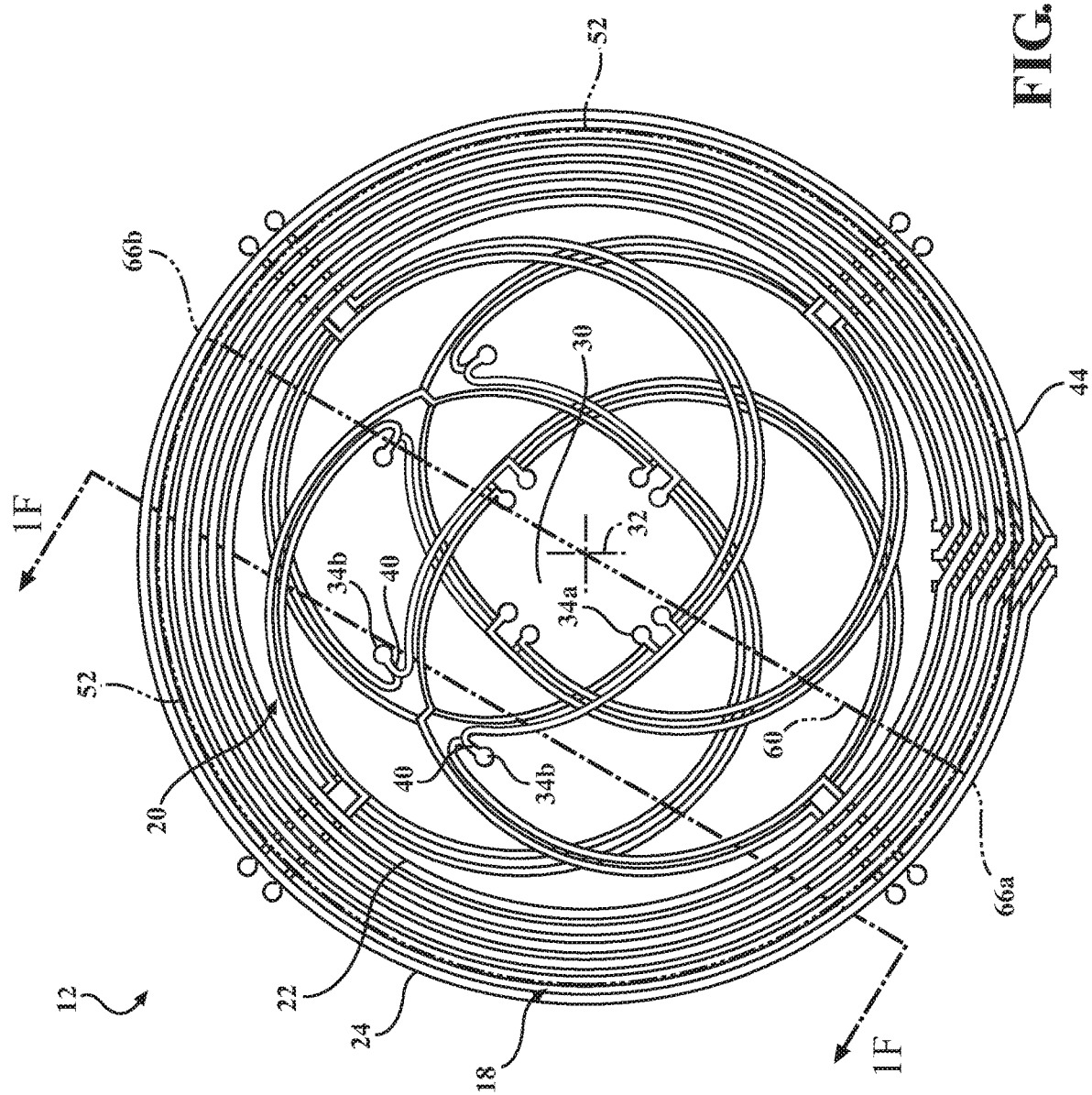
FIG. 1C schematically depicts an isolated bottom view of a sensor of the sensor assembly of FIG. 1A according to one or more embodiments shown and described herein.
Figure 1E:
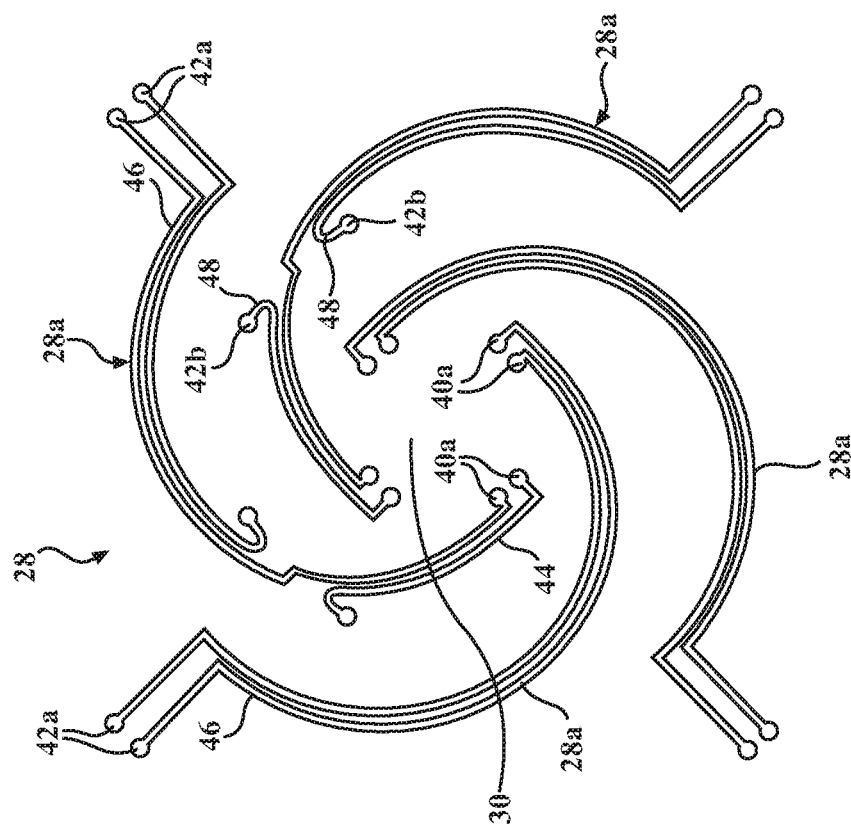
FIG. 1E schematically depicts an isolated top view of a second receiver coil of the sensor of FIG. 1C according to one or more embodiments shown and described herein.
Figure 1D:
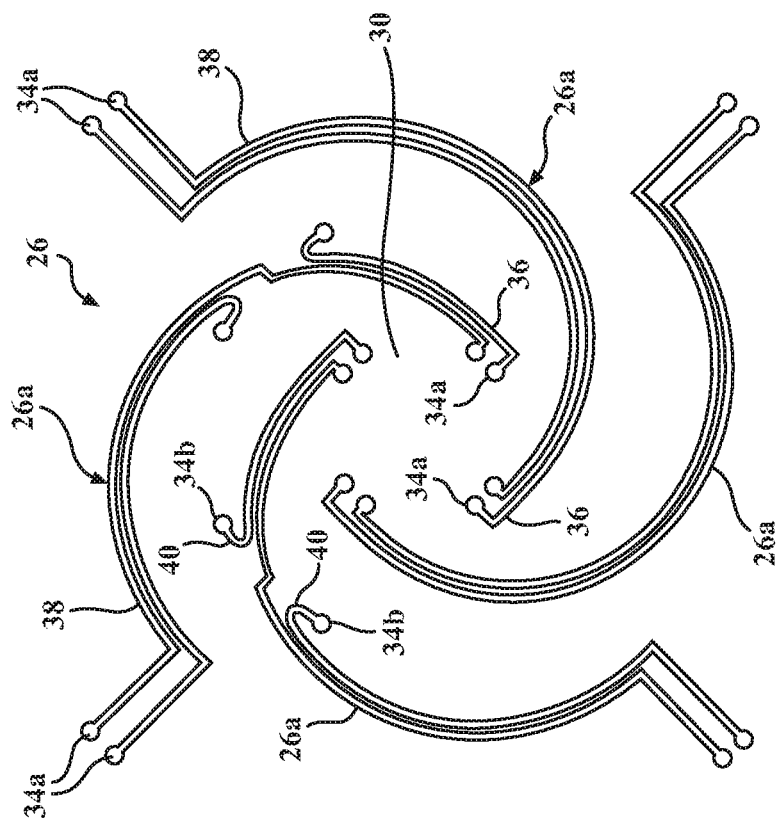
FIG. 1D schematically depicts an isolated top view of a first receiver coil of the sensor of FIG. 1C according to one or more embodiments shown and described herein.

The plurality of crescent shaped coils 26a of the first receiver coil 26 and the plurality of crescent shaped coils 28a of the second receiver coil 28 are oppositely wound and/or offset in opposite directions such that the coils are oppositely facing around the center region 30, as best seen in FIGS. 1D-1E. It is appreciated that the first receiver coil 26 and the second receiver coil 28 may be identically offset using the equation $$\frac{90}{N}$$

degrees where N is equal to the number of poles. In this example, and not by way of limitation, there is one pole so the first receiver coil 26 and the second receiver coil 28 are offset by 90 degrees. As such, the plurality of crescent shaped coils 26*a* of the first receiver coil 26 and the plurality of crescent shaped coils 28*a* of the second receiver coil 28 are offset from one another such that the connection junctions 34*a*, 34*b* of the first receiver coil 26 align with the connection junctions 42*a*, 42*b* of the second receiver coil 28. In some embodiments, the corresponding of the connection junctions 34*a*, 34*b* of the first receiver coil 26 to the connection junctions 42*a*, 42*b* of the second receiver coil 28 permit communication with the sensor 12.

For example, the term 'receiver signal' can be used generally to refer to signals induced in the receiver coil, and also to any conditioned signal based on the signals induced in the two-part receiver coil 20. In examples discussed below, a single receiver signal is provided by the two-part receiver coil 20 that includes contributions from a first and second signals formed in first receiver coil 26 and the second receiver coil 28 loop configurations. That is, the first receiver coil 26 and the second receiver coil 28 provide first and second signals, respectively. The receiver signal is then some combination of the first and second signals.

For example, the first receiver coil 26 and the second receiver coil 28 configurations may be configured to generate signals that are of opposite phase, the receiver signal being the combination of the first and second signals, and hence the receiver signal has a minimum value when the first and second signals have similar magnitudes. The receiver signal may also be termed a difference signal, as the magnitude of the receiver signal is a difference between a first signal amplitude induced in the first receiver coil 26, and a second signal amplitude induced in the second receiver coil 28.

In other examples of the present invention, the receiver coil may provide separate first and second signals from separate loop structures to an electronic circuit for processing.

The first receiver coil 26 and the second receiver coil 28 configurations of the two-part receiver coil 20 may be configured to provide first and second voltages of opposite polarity for a given magnetic flux change through the two-part receiver coil 20. The two-part receiver coil 20 may be configured so that the first and second signals tend to cancel each other in the absence of the coupler element. The coupler element also may have a zero position in which it blocks flux transmission to the first receiver coil 26 and the second receiver coil 28 equally, such that the first signal and second signal effectively cancel each other out. As the coupler element moves in a first direction relative to the initial position, it blocks more magnetic flux inducing the second signal, while at the same time blocking less magnetic flux that induces the first signal. Hence, the magnitude of the first signal increases, the magnitude of the second signal decreases, and the receiver signal increases in magnitude. The coupler element may also be moveable in a second direction, in which the magnitude of the second signal increases, and that of the first signal decreases.

The first receiver coil 26 and the second receiver coil 28 may be positioned in separate layers of the PCB 35 in the axial direction or in the vertical direction (i.e., in the +/−Z-direction) such that a difference in the distance or airgap from the first end 14 of shaft 16 is created. It should be appreciated that the depth of the plurality of crescent shaped coils 26*a* of first receiver coil 26 and the plurality of crescent shaped coils 28*a* of the second receiver coil 28 are selected with a relationship to the first end 14 of the shaft 16 based on a strength of the signal required for the airgap or distance. That is, each one of the plurality of crescent shaped coils 26*a* of first receiver coil 26 is in one layer of the PCB 35 and each one of the plurality of crescent shaped coils 28*a* of the second receiver coil 28 are in an another or different layer of the PCB 35 from the plurality of crescent shaped coils 26*a* of first receiver coil 26. In some embodiments, the first receiver coil 26 and the second receiver coil 28 may be positioned in adjacent or adjoining layers. In other embodiments, the first receiver coil 26 and the second receiver coil 28 may be positioned in layers that are spaced apart or separated by another layer that may be unoccupied or may contain other coils (i.e. a portion of the transmitter coil and the like).

Figure 1F:
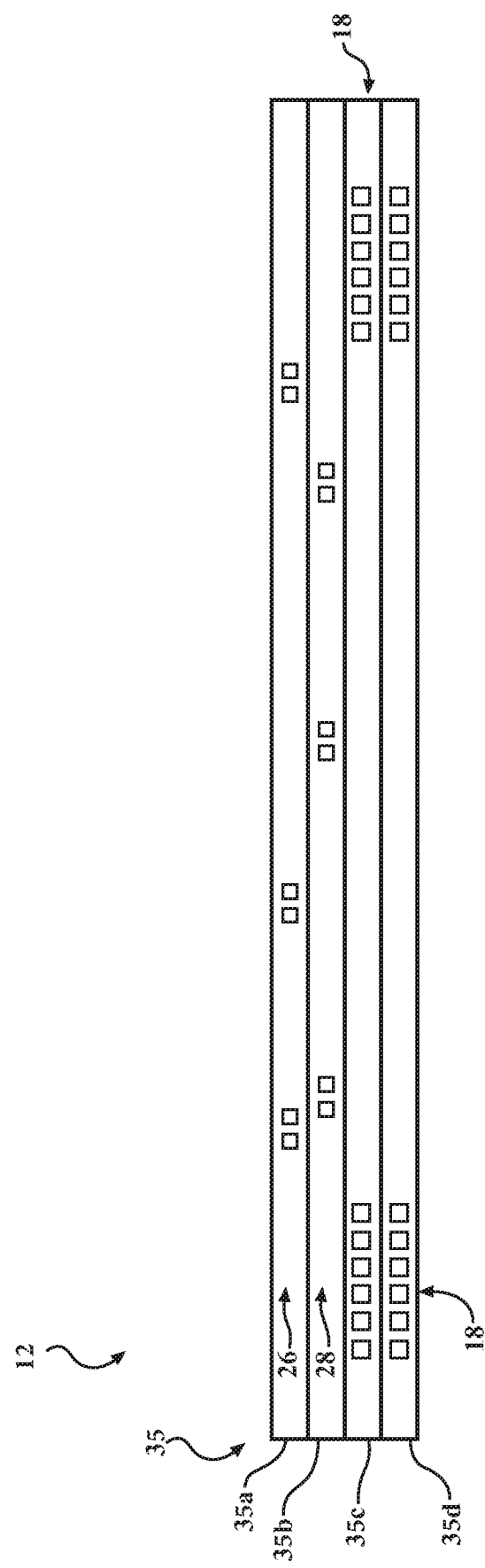
FIG. 1F schematically depicts a cross-sectional view of the sensor of FIG. 1AC taken from line 1F-1F according to one or more embodiments shown and described herein.

As such, portions of the first receiver coil 26 overlap portions of the second receiver coil 28 and portions of the second receiver coil 28 under lap portions of the first receiver coil 26, as best seen in FIGS. 1A-1B for this embodiment and shown in the cross-sectional view of FIG. 1F. As such, it should be appreciated that the overlap portions are not connected with the path of the coil above and/or below, and that this coil arrangement permits sensing of the first end 14 of the shaft 16 from different distances or air gaps and permits the first receiver coil 26 and the second receiver coil 28 to act as independent coils. In yet other embodiments, portions of the first receiver coil 26 and the second receiver coil 28 are disposed within the same layer of the PCB 35 so to have the same depth in the vertical direction (i.e., in the +/−Z-direction) or airgap from the first end 14 of shaft 16.

It should also be appreciated that the plurality of crescent shaped coils 26*a* of first receiver coil 26 and the plurality of crescent shaped coils 28*s* of the second receiver coil 28 are depicted as each having four coils, but this is a non-limiting example and the two-part receiver coil 20 may have more or less. In addition, it should be appreciated that there may be more crescent shaped coils 26*a* in the first receiver coil 26 than in the second receiver coil 28, and vice versa. Further, it should be appreciated that the plurality of crescent shaped coils 26*a* of first receiver coil 26 and the plurality of crescent shaped coils 28*a* of the second receiver coil 28 may be coplanar with the transmitter coil 18 or may be in parallel planes with each other and/or with the transmitter coil 18.

Still referring to FIGS. 1A-1F, the transmitter coil 18, the first receiver coil 26 and the second receiver coil 28 may be printed on and/or within different layers of the PCB 35, a circuit board, and the like, as discussed in greater detail herein. The PCB 35 may be circular to match the first end 14 of the shaft 16 or may be any shape such as a shape that that fits packaging constraints and/or the like (i.e. square, rectangular, elliptical, and the like). Further, the transmitter coil 18, the first receiver coil 26 and the second receiver coil 28 may be layered within different layers of the PCB 35, may have traces connecting the coils, the coils may include traces, and/or the like.

Referring to FIG. 1F, a cross-sectional view of the sensor assembly 10 of FIG. 1C taken from line 1F-1F will be described. As discussed above, the first receiver coil 26 may be disposed within a particular layer or set of layers of the PCB 35 while the second receiver coil 28 may be disposed within another particular layer or set of layers of the PCB 35. In addition, the transmitter coil 18 may be disposed within a particular layer or set of layers of the PCB 35. For example and not a limitation, the first receiver coil 26 is positioned in a first layer 35*a* and the second receiver coil 28 are positioned in a second layer 35*b* such that each occupy separate layers of the PCB 35, as explained above. Further, transmitter coil 18 is illustrated as being positioned in a third layer 35c and in a fourth layer 35d such that each occupy separate layers of the PCB 35. It should be appreciated that is merely an example and is not a limit of the transmitter coil 18 or the two-part receiver coil 20 as discussed and described herein. As such, it should also be appreciated that each layer of the PCB 35 may have a different coil. Further, it should be appreciated that the two-part receiver coil 20 is above the transmitter coil 18 in the axial or vertical direction (i.e., in the +/−Z-direction) with respect to the shaft 16. It should also be appreciated that the PCB 35 may have more than four layers and that some layers may be unoccupied by a coil or the like.

Referring back to FIGS. 1A-1C, the first end 14 of the shaft 16 will be described. The shaft 16 may be an elongated member having the first end 14 and an opposite second end (not shown). It should be appreciated that the second end may be attached to a device (not shown) such that the second end rotates or moves (i.e., linearly, curvilinear, elliptically, and the like) with respect to the sensor assembly 10 about a shaft axis 50.

The first end 14 is integrally formed from the shaft 16. That is the first end 14 is the shaft 16, but incorporating geometrical differences, as discussed in greater herein, to form a target 15 in a bottom surface 54 that includes a first planar surface portion 56 and a second planar surface portion 58. That is, the first end 14 of the shaft 16 is the target 15, or a coupler element, configured to modify the inductive coupling between the transmitter coil 18 and the two-part receiver coil 20. As such, the first end 14 includes a cylindrical outer surface 52 and the bottom surface 54. In embodiments, the bottom surface 54 includes the first planar surface portion 56 and the second planar surface portion 58. The first planar surface portion 56 is a metallic material. In some embodiments, the metallic material is the same material as the shaft 16. In other embodiments, the metallic material is added to the first end 14 using suitable or conventional methods as appreciated by one skilled in the art, such as a weld, soldier, mig, tig, and the like. It should be appreciated that in either embodiment, the first planar surface portion 56 is an eddy plate.

The second planar surface portion 58 may be made or created from a layer of magnetic material. In these embodiments, the layer of magnetic material may be a soft magnetic material, such as ferrite. In other embodiments, the material suitable to have magnetic properties that induces the eddy currents may be other material besides ferrite such as rare earth magnetics, aluminum, iron, cobalt, nickel, and/or the like. It should be appreciated that the layer of magnetic material is added using conventional techniques as appreciated by those skilled in the art. As such, the magnetic layer forms a sheet along the bottom surface 54. Further, it should be appreciated that the thickness of the layer of magnetic material may change based on the type of magnetic material, the air cap between the first end 14 of the shaft 16 and the sensor 12, and the like.

As such, because the bottom surface 54 of the first end 14 of the shaft 16 has metallic surfaces in close proximately to the transmitter coil 18 and the two-part receiver coil 20, the sensor assembly 10 may be compact. Further, because of this arrangement, eddy currents are induced due to Faraday's Law. These eddy currents generate a magnetic field in the opposite direction of the source field resulting in an attenuated overall field. Therefore, the coupling factor, or the flux generated from the transmitter coil 18 penetrating the two-part receiver coil 20 is reduced. Further, the magnetic field in the opposite direction of the source field creates issues of concentricity errors, which in turn generate deviations in the sensor assembly output curve, or linearity errors.

It should be appreciated that the second planar surface portion 58 extends from the first planar surface portion 56 to form the target 15. In some embodiments, the second planar surface portion 58 abuts the first planar surface portion 56. In some embodiments, the second planar surface portion 58 extends from bottom surface 54 at different the vertical depth (i.e., in the +/−Z-direction) than the first planar surface portion 56. That is, in some embodiments, the first planar surface portion 56 if formed integrally with the first end 14 of the shaft and the second planar surface portion 58 is added to the bottom surface 54, as a thin layer so there is a height or depth difference in the vertical direction (i.e., in the +/−Z-direction with respect to the sensor 12) between the first planar surface portion 56 and the second planar surface portion 58.

In some embodiments, the first planar surface portion 56 and the second planar surface portion 58 are each half-moons, or a semi-circular shape, with the radius portions formed by the curvature of the cylindrical outer surface 52 and the linear portions abut each along midpoint of the shaft 16 and along the bottom surface 54 forming a straight edge 60. The straight edge 60 is where the material changes from the metallic material to the layer of magnetic material and vice-versa. The straight edge 60 extends between the cylindrical outer surface 52, which creates a pair of edges 66a, 66b of the straight edge 60. The straight edge 60 and the bottom surface 54 may be part of the coupler target. It should be appreciated that in some embodiments, the cylindrical outer surface 52 may be milled, machined, and/or the like such that the target coupler is reduced in size such that the pair of edges 66a, 66b of the straight edge 60 would be more inboard in this embodiment. As best seen in FIG. 1B, the edges 66a, 66b and the cylindrical outer surface 52 may be positioned over the transmitter coil 18 while the straight edge 60 traverses the two-part receiver coil 20 and extends over at least a portion of the transmitter coil 18, in the one-pole sensor arrangement.

In other embodiments, the cylindrical outer surface 52 may be milled, machined, and/or the like so to incorporate the geometric differences such as forming a flat portion in the cylindrical outer surface, which creates an undercut portion. That is, a flat portion may be formed by removing cylindrical outer surface in radially from the shaft axis 50. The undercut portion has a void or is missing shaft material. That is, creating the flat portion in the cylindrical outer surface radially from the shaft axis 50 shaves or removes a portion of the cylindrical outer surface and a portion of the bottom surface 54 such that portions of the cylindrical outer surface 52 and the bottom surface 54 of the first end 14 are removed forming two separate planar portions at two separate heights in the vertical direction (i.e., in the +/−Z-direction) with a wall extending coaxially with the shaft axis 50 towards the second end (not shown) and terminates at an upper end at an undercut surface. That is, the undercut surface is a second planar surface spaced apart from the bottom surface 54. The under portion may be filled with the layer of magnetic material using conventional techniques as appreciated by those skilled in the art. Further, it should be appreciated that the thickness of the layer of magnetic material may change based on the type of magnetic material, the air cap between the first end 14 of the shaft 16 and the sensor 12, and the like.

The planar portions (i.e., one having a metallic material and the other having a magnetic material layer) forms a straight edge 60 in which the material changes from the metallic material to the layer of magnetic material and vice-versa, in the exact manner as described above.

As discussed above, the target 15 modifies the inductive coupling between the transmitter coil 18 and the two-part receiver coil 20. It should be appreciated that the target 15 need not be located between the transmitter coil 18 and the two-part receiver coil 20, though it could be if that was a convenient configuration. Further, the target 15 need not modify the total flux coupling between the transmitter coil 18 and the two-part receiver coil, but may only modify the spatial distribution of the flux coupling.

As discussed above, the target is formed from the first end 14 of the shaft 16 and the second end of the shaft 16 may be attached to, or otherwise mechanically coupled to a movable object, so that its rotational position is a function of the position of the movable object. For example, the first end 14 is of the shaft 16 is rotated or moved about the shaft axis 50. In some embodiments, the shaft axis 50 is coaxially aligned with the central axis 32. The straight edge 60 rotates or moves at a distance from the transmitter coil 18 and the two-part receiver coil 20. The rotation or movement of the straight edge 60 and the bottom surface 54 of the cylindrical outer surface 52 of the first end 14 is detected by the sensor 12.

The configuration of the two-part receiver coil 20, as discussed above, may be such that a voltage is developed at the output of the two-part receiver coil 20, which is a function of the position of the target. The target 15 may have an initial position, relative to the two-part receiver coil 20, at which the receiver signal is a minimum. As the target moves from the initial position, it modifies the inductive coupling between the transmitter coil 18 and the first receiver coil 26 and the second receiver coil 28 configurations. In some embodiments, the initial configuration of the target, the first and second signals are of similar magnitude and of opposite phase, so they tend to cancel each other out. As the target moves, the inductive coupling between the transmitter coil 18 and the first receiver coil 26 increases, and at the same time the inductive coupling between the transmitter coil 18 and the second receiver coil 28 decreases, while the concentricity error, normally found in one-pole inductive sensors, is relaxed. The receiver signal increases, as the difference in magnitudes between the first and second signals increases. As such, the arrangement of the sensor 12 and the first planar surface portion 56 and the second planar surface portion 58 disposed along the bottom surface 54 of the first end, symmetry of a multi-pole inductive sensor assembly is achieved.

It should also be appreciated that the geometric arrangement of the target 15 formed in the first end 14 of the shaft 16 and the sensor assembly 10 arrangement corrects a nonsinusoidal input signal to the signal processor 70. That is, the sensor assembly 10 produces a sinusoidal curve in a polar coordinate system when detecting the target formed into the first end 14 of the shaft 16, in the form of the following parametric equation:

$$\begin{cases} x(t) = (a + b*\cos(t))*\cos(t) \\ y(t) = (a + b*\cos(t))*\sin(t) \end{cases}, 0 \le t \le 360°$$

where a=the average radii of the rotor; b=the difference between a and the maximum radii of the rotor; and t=parametric parameter varying from 0 to 360 degrees.

Further, it should be appreciated that the sensor arrangement allows for high order geometry harmonics to be included in the coil shape so as to further improve the sensor linearity errors. As such, the coil sinusoidal curve then becomes the following parametric equation:

$$\begin{cases} x(t) = (a + b*\cos(t) + b_3*\cos(3t) + \ldots )*\cos(t) \\ y(t) = (a + b*\cos(t) + b_3*\cos(3t) + \ldots )*\sin(t) \end{cases}, 0 \le t \le 360°$$

where a=the average radii of the rotor; b=the difference between a and the maximum radii of the rotor; b3=the coil shape; and t=parametric parameter varying from 0 to 360 degrees.

It should be appreciated that the combination of the bottom surface 54 having a metallic portion and a magnetic portion, the target 15 formed from the first end 14 of the shaft 16 has a symmetry in the overall field that was previously only achieved in multi-pole couplers. That is, the second planar surface portion 58 deflects the magnetic flux occurring in the inductive coupling between the transmitter coil 18 and the two-part receiver coil 20 such that the magnetic material of the second planar surface portion 58 induces a geometric symmetry to reduce and/or eliminate error associated with X and Y offsets, as will be described in greater detail below.

Figure 2A:
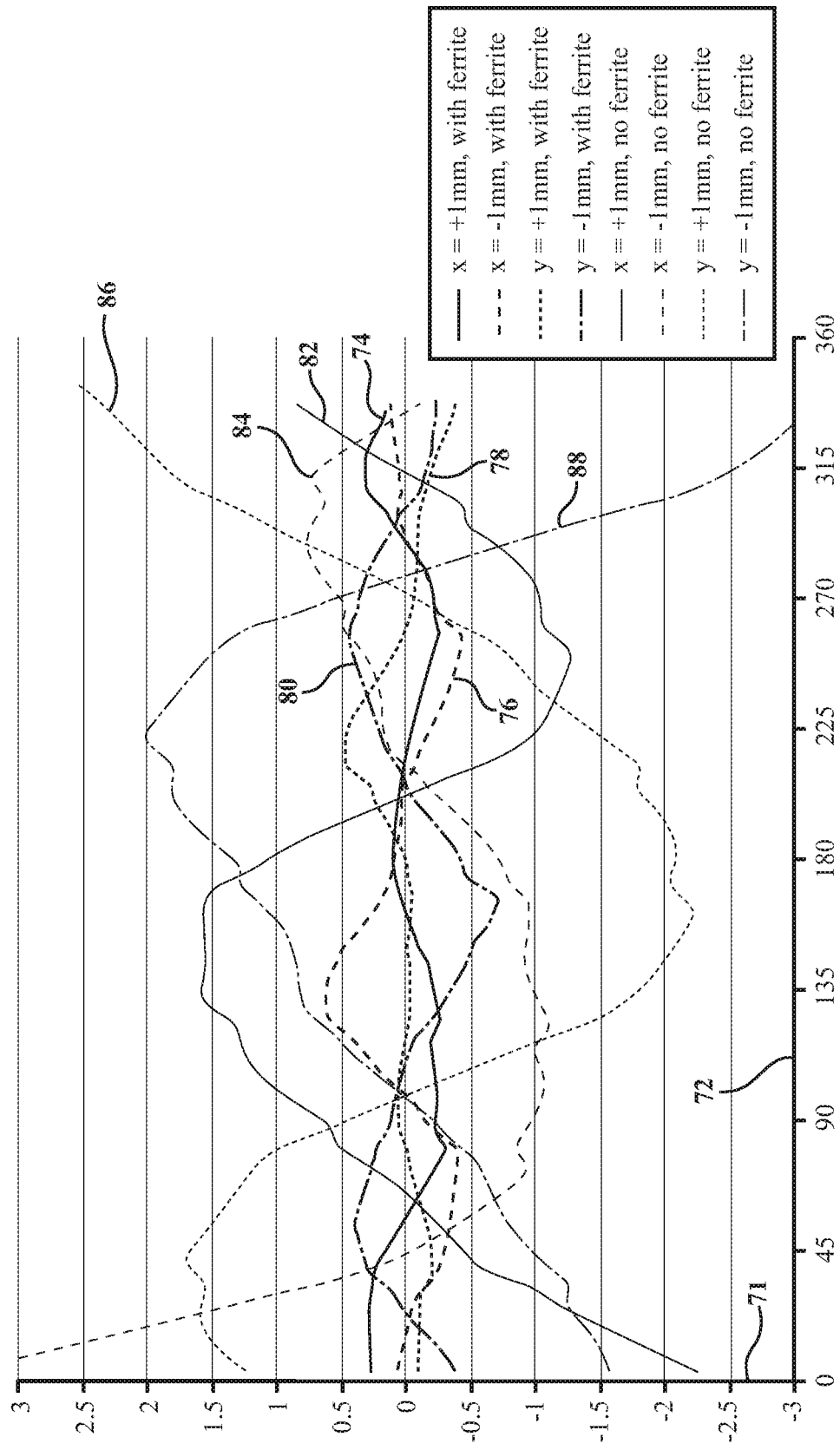
FIG. 2A schematically depicts a graph of the one-pole average linearity deviation of a XY offset.

Now referring to FIG. 2A the one pole linearity deviation with XY offset comparison is shown. An ordinate 71 represents a one-pole linearity deviation and an abscissa 72 represents degrees. As shown in FIG. 2A, the XY offset comparison includes 8 plots, a x=−1 mm with ferrite plot 74 representing the linearity when the shaft is shifted by 1 mm along the −X direction, a x=1 mm with ferrite plot 76 representing the linearity when the shaft is shifted by 1 mm along the +X direction, a y=−1 mm with ferrite plot 78 representing the linearity when the shaft is shifted by 1 mm along the −Y direction, a y=1 mm with ferrite plot 80 representing the linearity when the shaft is shifted by 1 mm along the +Y direction, a x=−1 mm without ferrite plot 82 representing the linearity when the shaft is shifted by 1 mm along the −X direction, a x=1 mm without ferrite plot 84 representing the linearity when the shaft is shifted by 1 mm along the +X direction, a y=−1 mm without ferrite plot 86 representing the linearity when the shaft is shifted by 1 mm along the −Y direction, and a y=1 mm without ferrite plot 88 representing the linearity when the shaft is shifted by 1 mm along the +Y direction.

FIG. 2A illustrates that the ferrite material 66 significantly reduces the average linearity error by inducing a geometric symmetry as opposed to the no ferrite plots where there is still geometric asymmetry due to the offset of the shaft. As such, this one-pole sensor assembly improves mechanical compliance and is tolerable to the mechanical concentricity error.

Figure 2B:
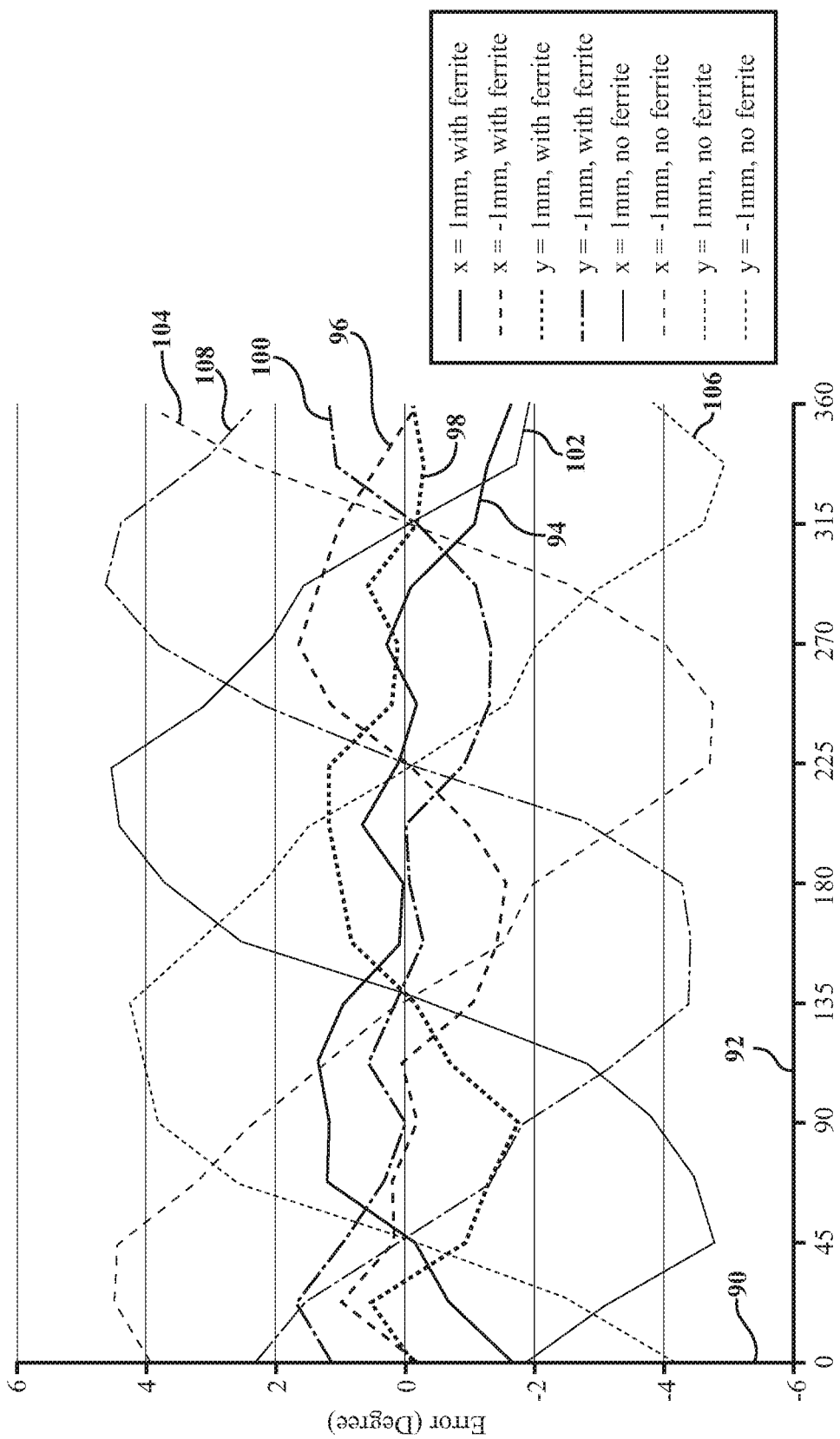
FIG. 2B schematically depicts a graph of the one-pole average linearity percentages of a XY offset.

Now referring to FIG. 2B the one pole linearity error with XY offset comparison is shown. An ordinate 90 represents a one-pole linearity error and an abscissa 92 represents degrees. As shown in FIG. 2B, the XY offset comparison includes 8 plots, a x=−1 mm with ferrite plot 94 representing the linearity when the shaft is shifted by 1 mm along the −X direction, a x=1 mm with ferrite plot 96 representing the linearity when the shaft is shifted by 1 mm along the +X direction, a y=−1 mm with ferrite plot 98 representing the linearity when the shaft is shifted by 1 mm along the −Y direction, a y=1 mm with ferrite plot 100 representing the linearity when the shaft is shifted by 1 mm along the +Y direction, a x=−1 mm without ferrite plot 102 representing the linearity when the shaft is shifted by 1 mm along the −X direction, a x=1 mm without ferrite plot 104 representing the linearity when the shaft is shifted by 1 mm along the +X direction, a y=−1 mm without ferrite plot 106 representing the linearity when the shaft is shifted by 1 mm along the −Y direction, and a y=1 mm without ferrite plot 108 representing the linearity when the shaft is shifted by 1 mm along the +Y direction.

FIG. 2B illustrates that the ferrite material 66 significantly reduces the linearity error percentage by inducing a geometric symmetry as opposed to the no ferrite material plots where there is still geometric asymmetry due to the offset of the shaft.

It should be appreciated that the embodiments described above incorporated the a target as a coupler element having a metallic portion and a magnetic portion such that the one-pole sensor arrangement has symmetry of a multi-pole inductive sensor assembly. That is, because of linearity and concentricity errors associated with one-pole inductive position sensors, the target described herein reinforces the imposed field such that together the metallic portion and the magnetic portion together form symmetry in the field only seen in multi-pole couplers and improve the linearity and concentricity errors.

What is claimed is:

1. An inductive sensor assembly comprising:
   a sensor assembly having a transmitter coil and a receiver coil;
   a shaft comprising:
      a first end having a first planar surface and a second planar surface, the second planer surface extends from the first planar surface, and
      a target formed by the first planar surface and the second planar surface, wherein when the target is moved about a shaft axis, the first planar and second planar surfaces modify an inductive coupling between the transmitter coil and the receiver coil.

2. The inductive sensor assembly of claim 1, wherein the inductive sensor assembly is a one-pole sensor assembly.

3. The inductive sensor assembly of claim 1, wherein the first planar surface is a metallic material.

4. The inductive sensor assembly of claim 3, wherein the metallic material of the first planar surface is configured to form an eddy plate, the eddy plate is configured to block a magnetic flux between the transmitter coil and the receiver coil.

5. The inductive sensor assembly of claim 1, wherein the second planar surface is a layer of magnetic material.

6. The inductive sensor assembly of claim 5, wherein the layer of magnetic material is a soft magnetic material.

7. The inductive sensor assembly of claim 6, wherein the layer of soft magnetic material is ferrite.

8. The inductive sensor assembly of claim 1, wherein the first planar surface is a half-moon in shape and the second planar surface is a half-moon in shape.

9. The inductive sensor assembly of claim 1, wherein the receiver coil is a two-part receiver coil.

10. The inductive sensor assembly of claim 1, wherein the target has a straight edge.

11. A one-pole inductive sensor assembly comprising:
    a sensor assembly having a transmitter coil and a two-part receiver coil;
    a shaft comprising:
       a first end,
       a target disposed within the first end, the target comprising:
          a first planar surface formed by a metallic material, and
          a second planar surface extending from the first planar surface, the second planar surface is formed by a layer of magnetic material,
    wherein when the target is moved about a shaft axis, the first planar and second planar surfaces modify an inductive coupling between the transmitter coil and the two-part receiver coil such there is a symmetry of a multi-pole inductive sensor assembly.

12. The one-pole inductive sensor assembly of claim 11, wherein the metallic material of the first planar surface is configured to form an eddy plate, the eddy plate is configured to block a magnetic flux between the transmitter coil and the two-part receiver coil.

13. The one-pole inductive sensor assembly of claim 11, wherein the layer of magnetic material is a soft magnetic material.

14. The one-pole inductive sensor assembly of claim 13, wherein the layer of soft magnetic material is ferrite.

15. The one-pole inductive sensor assembly of claim 13, wherein the first planar surface is a half-moon in shape and the second planar surface is a half-moon in shape.

16. The one-pole inductive sensor assembly of claim 11, wherein the target has a straight edge.

\* \* \* \* \*